Dec. 17, 1935.  S. BERMAN  2,024,844
PARKING DEVICE
Filed Jan. 23, 1934  3 Sheets-Sheet 1

Stanley Berman
INVENTOR
his ATTY.

Dec. 17, 1935.  S. BERMAN  2,024,844
PARKING DEVICE
Filed Jan. 23, 1934  3 Sheets-Sheet 2
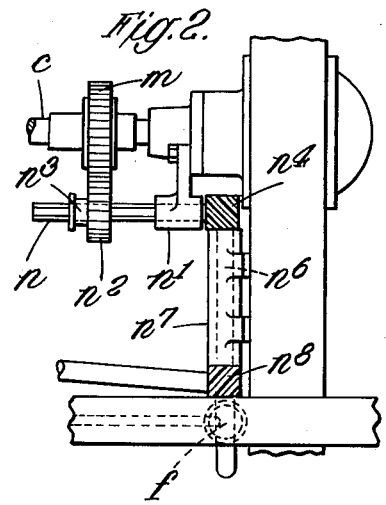
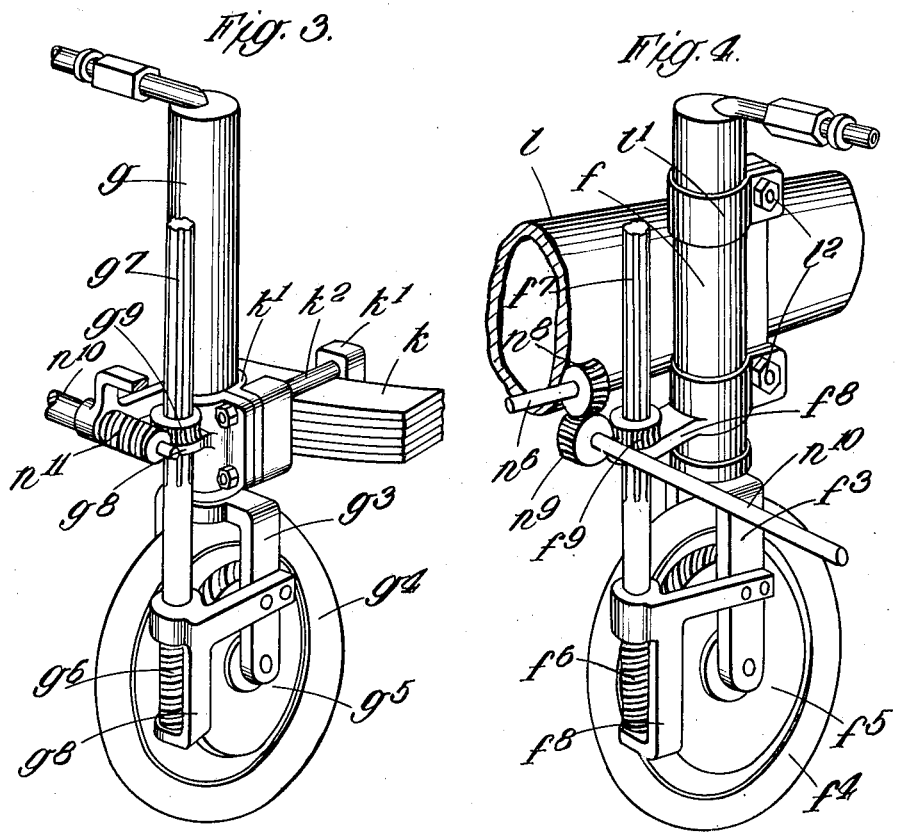
Stanley Berman
INVENTOR
By Otto [illegible]
his ATTY.

Dec. 17, 1935.  S. BERMAN  2,024,844
PARKING DEVICE
Filed Jan. 23, 1934  3 Sheets-Sheet 3
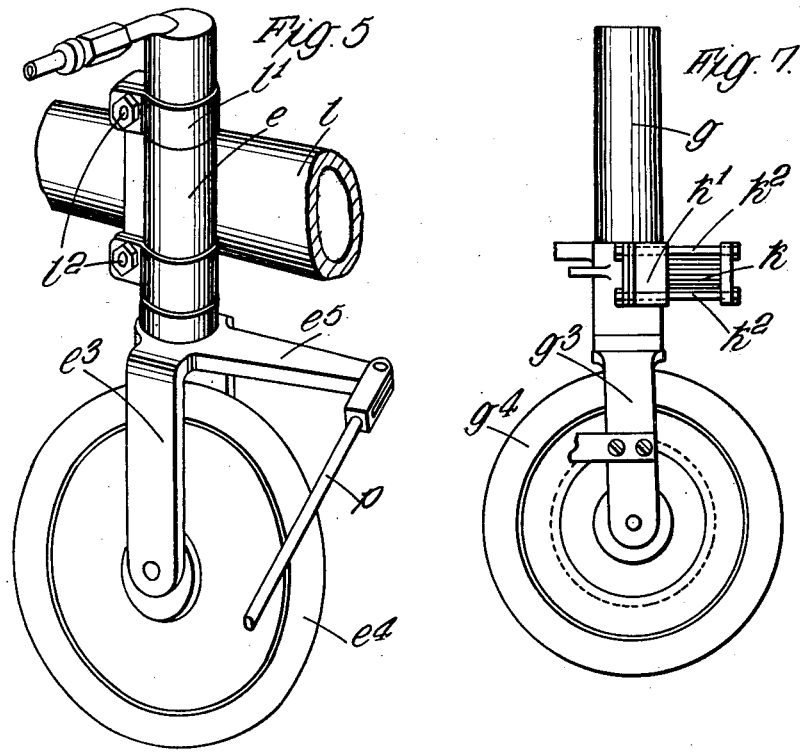
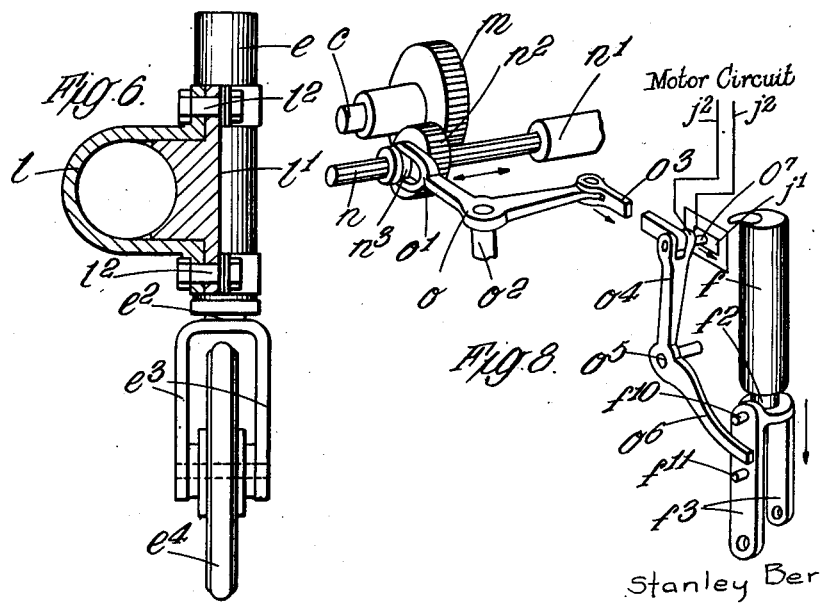
Stanley Berman
INVENTOR
his ATTY.

Patented Dec. 17, 1935

2,024,844

UNITED STATES PATENT OFFICE 2,024,844

PARKING DEVICE

Stanley Berman, London, England

Application January 23, 1934, Serial No. 707,961
In Great Britain January 30, 1933

17 Claims. (Cl. 180—1)

This invention relates to improvements in motor vehicles and in lifting and moving devices therefor. Now it is very well known to all motorists that, when it is desired to park the car at the side of the road, there is often only a comparatively small space between two cars in the line into which the car can be placed. Particularly, if this space is only just longer than the overall length of the car, is the task of manoeuvering the car into the space difficult, and it occupies a considerable amount of time. The same trouble is also experienced when it is desired to take the car out of a long line of parked cars, since there is then very often not sufficient space to move the car at all.

In addition to these disadvantages, due to the inability to move a motor car sideways during parking the same disadvantage is experienced in garages and also with commercial vehicles when the same are being unloaded or loaded in narrow streets or alleys.

These disadvantages are overcome by means of the present invention according to which a motor vehicle is provided with a plurality of jacks so disposed and mounted on the vehicle that the whole can be lifted bodily until its running wheels are clear of the ground, said jacks being each provided at its lower end with a wheel or the like, whereby the car after it has been raised may be moved sideways on the wheels at the lower ends of the jacks.

Means are preferably provided to drive two or more of the wheels at the lower ends of the jacks from the engine of the vehicle, conveniently the two near side wheels, and means may also be provided for steering the vehicle when it is supported on the wheels at the lower ends of the jacks conveniently by moving the two off side wheels, as hereinafter described. The jacks are also preferably operated hydraulically from the inside of the car so that the driver of the vehicle can move the car sideways without leaving his seat.

In order that this invention may be the more clearly understood and readily carried into effect, I will proceed to describe the same with reference to the accompanying drawings, which illustrate by way of example and not of limitation one convenient embodiment of this invention, and in which Figure 1 is a plan view of the chassis of a motor vehicle fitted with the jacks and other improvements according to this invention.

Figure 2 is a plan view on an enlarged scale of part of the mechanism shown in Figure 1, and showing particularly the method of conveying the drive from the engine to the jack wheels.

Figure 3 is a perspective view of one of the jacks disposed at the front of the vehicle and showing the method of mounting the jack and also the method of driving the wheel at the lower end thereof.

Figure 4 is a similar view of the rear near side jack.

Figure 5 is a perspective view of one of the off-side jacks illustrating the means of steering.

Figure 6 is a sectional elevation showing in greater detail the method of mounting the rear jack.

Figure 1:
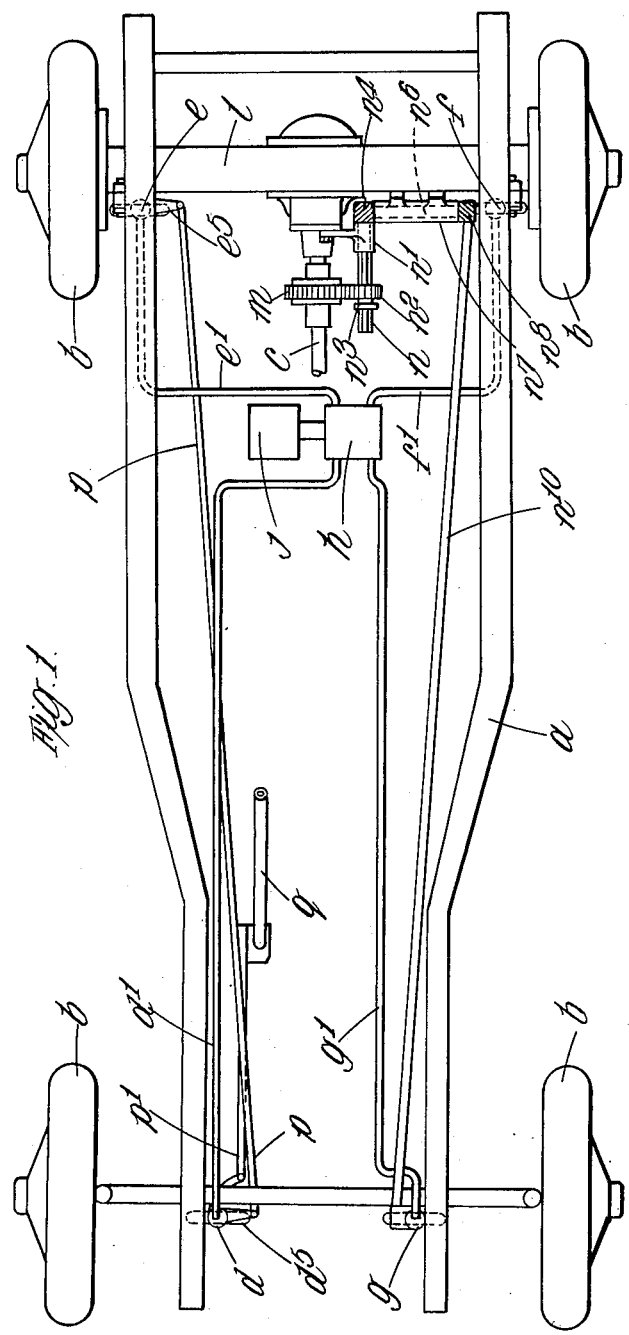

Figure 7 is a similar view illustrating the method of mounting the front jacks, and Figure 8 is a diagrammatic view illustrating one form of mechanism which may be used to connect up the driving means for the jacks when the vehicle is fully raised off its running wheels, also a means for automatically disconnecting the jack operating means when the vehicle has been raised sufficiently to clear its running wheels from the ground.

Refrring now to the drawings, for the sake of simplicity the body of the motor vehicle has been omitted from Figure 1, in which is illustrated diagrammatically the chassis $a$, running wheels $b$ and propeller shaft $c$ which is driven in the usual way through a gear box and clutch (not shown) from the engine of the vehicle which also for the purpose of simplifying the drawings has not been shown.

In the particular arrangement shown in the drawings, four jacks $d$, $e$, $f$ and $g$ are provided to raise the vehicle off the ground, these jacks being of the hydraulic type and each being connected through a pipe ($d^1$, $e^1$, $f^1$ and $g^1$ respectively) to an oil or like pump $h$ which is driven from an electric motor indicated diagrammatically at $j$. The electric motor is driven from the starter battery or any other suitable source of power and the switch for the same is controlled by the driver of the vehicle preferably without leaving his seat. In place of the electric motor $j$, any other device may be employed for driving the pump $h$, for example, the engine of the vehicle or, in some cases, the pump may be driven by hand.

As the four jacks $d$, $e$, $f$ and $g$ are all connected to the pump $h$, it will be seen that the vehicle will be raised equally when the pump is operated.

Each of the jacks is of substantially the known construction and the plungers $e^2$, $f^2$ and similar plungers for jacks $d$ and $g$ thereof are at their lower ends provided with forks $e^3$, $f^3$ and $g^3$, and a similar fork for jack $d$ between the limbs of which are journalled wheels $e^4$, $f^4$ and $g^4$ and a similar wheel for jack $d$. The normal position of the wheels $e^4$, $f^4$ and $g^4$ is such that they lie at right angles to the length of the motor vehicle although, as hereinafter explained, the two off-side wheels may be so mounted that they can be moved for the purpose of steering the vehicle when it is raised on the wheels $e^4$, $f^4$ and $g^4$.

In order to facilitate the changing of the jack wheels or the mending of a puncture, if pneumatic tyres are used, the spindles on which the jack wheels are mounted in the forks may be removable. For example, they may at one end be threaded and be provided with lock nuts outside the forks.

The jacks $d$, $e$, $f$ and $g$ may be mounted on the vehicle in any suitable way, for example, they may be bolted to the chassis frame. In the accompanying drawings, however, there is shown, by way of example, an alternative method of mounting. In this case, the two front jacks $d$ and $g$ are mounted on the front springs $k$ of the vehicle and the rear jacks are mounted on the tubes $l$ enclosing the rear shafts by means of two-part brackets $k^1$ and $l^1$ which can be bolted about the springs and tubes by means of bolts $k^2$ and $l^2$ respectively to hold the jacks in position.

It is to be clearly understood that I do not wish to limit myself either to the particular method of mounting the jacks or to the particular positioning of the same about the chassis. Both of these may be altered at will without departing from the scope of the present invention.

Dealing now with the method of driving the jack wheels, as above stated, the two near side jack wheels are driven from the engine of the vehicle. For this purpose there is fixed on the propeller shaft $c$ a pinion $m$ and parallel to the propeller shaft and supported in a bracket $n^1$ is a splined shaft $n$. On this splined shaft $n$ is slidably arranged a pinion $n^2$, which pinion is provided with a grooved neck or boss $n^3$ by means of which it can be slidden backwards and forwards along the splined shaft $n$ so as to bring it into engagement with and disengage it from the pinion $m$. At its rear end, the splined shaft is provided with a helical or other pinion $n^4$, gearing with a like pinion under the pinion $n^4$ on a transverse shaft $n^6$ carried in a bearing $n^7$ attached to the axle tube $l$. At its outer end, the shaft $n^6$ is provided with a helical or other pinion $n^8$ driving a pinion $n^9$ fixed to a shaft $n^{10}$ which runs from front to back of the vehicle (see Figure 1). It will thus be seen that, when the pinion $n^2$ is engaged with the pinion $m$ and the propeller shaft is driven from the engine, the shaft $n^{10}$ will be rotated.

The wheels $f^4$ and $g^4$ of the near side jacks are provided with gear wheels $f^5$ and $g^5$ which are fixed to the wheels, and engaging with these gear wheels are worms $f^6$ and $g^6$ which are fixed at the lower end of vertical splined shafts $f^7$ and $g^7$ carried in brackets $f^8$ and $g^8$ on the forks and jacks respectively. Also arranged on the splined shafts are pinions $f^9$ and $g^9$ which are provided with collars running in one of the brackets $f^8$ and $g^8$ so that these pinions are thereby prevented from moving downwardly when the jacks are operated. Due to the fact that the splined shafts are fixed at their lower ends to the forks, when the jacks are operated the splined shafts will slide through the pinions but at all times rotation of the pinions $f^9$ and $g^9$ will be effective to rotate the wheels $f^4$ and $g^4$. These pinions $f^9$ and $g^9$ are driven from the shaft $n^{10}$. At the rear the pinion $n^9$ engages with the pinion $f^9$ whilst, at the front end of the vehicle, the pinion $g^9$ is engaged by a pinion $n^{11}$ on the front end of the shaft $n^{10}$. Thus at all times it will be possible to drive the wheels $f^4$ and $g^4$.

Means may be provided automatically to engage the pinion $n^2$ with the pinion $m$ when the jacks are fully lowered and to disengage the same when the jacks are lowered insufficiently to lift the vehicle to such an extent that its running wheels are clear of the ground. Any suitable means may be incorporated for this purpose, one construction being shown by way of example only in Figure 8 of the accompanying drawings. In the construction shown in Figure 8 there is provided a bell crank lever $o$ having at the end of one arm a fork $o^1$ which fits in the grooved boss $n^3$ of the pinion $n^2$. This bell crank lever $o$ is pivoted on a vertical axis $o^2$ and the other arm of the same is linked by a link $o^3$ to a further bell crank lever $o^4$ which is pivoted on a horizontal axis $o^5$. The horizontal arm $o^6$ of this bell crank lever $o^4$ projects close to the fork $f^3$ of the rear near side jack $f$, this fork being provided with two projections or abutments $f^{10}$ and $f^{11}$ which lie in the path of the end of the arm $o^6$ of the bell crank lever $o^4$. Normally when the jack $f$ is raised the pinion $n^2$ is disengaged from the pinion $m$. As the jack $f$ descends, however, the top abutment $f^{10}$ engages with the arm $o^6$ of the bell crank lever $o^4$ and rocks the same, this movement being communicated through the link $o^3$ and bell crank lever $o$ to the pinion $n^2$ to cause the same to engage with the pinion $m$. Thus, when the jacks are all lowered the propeller shaft is ready to drive the shaft $n^{10}$ and by causing the engine to drive the propeller shaft in the usual way the car can be moved sideways under its own power.

A spring may be provided to return the pinion $n^2$ to its position of non-engagement with the pinion $m$ when the jacks are raised to lower the car on to its running wheels, or, alternatively, in order to avoid the use of springs, the lower abutment $f^{11}$ may be used for the same purpose, this abutment engaging with the end of the arm $o^6$ as the car is lowered in order to move the pinion $n^2$ out of engagement with the pinion $m$ and so disconnect the drive from the shaft $n^{10}$.

Means may also be provided for stopping the pump $h$ when the jacks are fully lowered, said means conveniently comprising, as shown in Figure 8, a make-and-break electrical contact $j^1$ included in the circuit $j^2$ of the electric motor $j$ driving the pump $h$, the arrangement being such that a suitable abutment on one of the forks $e^3$, $f^3$ and $g^3$, preferably the abutment $f^{10}$ on the fork $f^3$, engages through the bell crank lever $o^4$ and pivot pin $o^7$ with this contact to open the same by moving out of contact therewith in the direction of the upper arrow, when the jacks are fully lowered, thereby opening the circuit of the electric motor $j$ and stopping the pump.

Means are also provided for steering the car when it is raised on the jack wheels, said means being adapted to swing the off-side wheels such as $e^4$. Any suitable means may be provided for this purpose, for example, as shown in the drawings the forks such as $e^3$ may be provided with outstanding brackets $d^5$ and $e^5$, these brackets being linked together by a long link $p$ and also being connected by links $p^1$ to the steering column $q$ of the vehicle. It will thus be seen that by appropriate manipulation of the steering wheel the car can, during its sideways movement on the jack wheels, be steered or guided at will.

Many modifications and additions may be made to the above described particular construction of the device according to this invention, for example, one or more universal joints may be provided in the shaft $n^{10}$, particularly near to the pinions $n^9$ and $n^{11}$.

If desired, valves may be provided in each of the pipes $d^1$, $e^1$, $f^1$ and $g^1$ leading the oil or the like from the pump $h$ to the jacks so that, instead of raising the car as a whole, any one jack or any combination of jacks may be operated. In this way any one running wheel may be raised from the ground for the purpose of changing the wheel or for any other purpose. Instead of having a valve in each of the pipes, the pump itself may be provided with a valve which will cause the oil to be pumped to any or all of the jacks.

In a modified construction according to this invention the wheels at the lower ends of the jacks are adapted to be driven from the engine of the car by a chain drive from the main shaft to the wheels, with a suitable chain tightening device to keep the chain taut when the jack wheels are raised, or preferably the jack wheel spindle is provided with a crown wheel with which is engaged a bevel pinion carried by a splined shaft in the piston rod. This splined shaft passes through a suitably splined bore of a bevel pinion or the like driven by a crown wheel which is driven by means of a chain from a sprocket wheel on the main shaft of the motor.

At a suitable point in the drive, a clutch is provided so that the jack wheels are not driven until the desired time. Such a clutch may comprise four outstanding arms splined on the main shaft and movable by means of a lever operated from the driver's seat to engage with four studs outstanding on the sprocket wheel which is loosely mounted on ball bearings on the main shaft. Any other suitable clutch arrangement may, however, be used without departing from the scope of the present invention. Further, all four of the jack wheels may be driven, or only one of the same, the other wheels being freely mounted at the ends of the jack piston rods.

It will thus be seen that with the arrangements according to the present invention the driver can drive his vehicle along a line of parked cars until he finds a space sufficient to receive his car. He then ranges his car alongside this space and operates the jacks. This, as above explained, will raise the running wheels off the ground and will leave the car standing on the transversely disposed jack wheels. By clutching up the jack wheel drive with the engine of the car the car can then be moved bodily sideways into the space in question and neatly parked therein, even if the space is only slightly longer than the overall length of the car. The car when once in position may be lowered on to its running wheels again, and when it is desired to take the car out of the line of parked cars the above operation is reversed.

The driver need not leave his seat to move the car in this way, and it will be seen that with the arrangement according to the present invention the car can be easily parked in and removed from very small space.

The sideways movement of the car obtained by the present invention may also be useful for moving cars for other than parking purposes.

If desired, two or more of the jack wheels may be fitted with brakes so that the sideways movement of the car may be arrested. These brakes may act on the jack wheels or on the shaft $n^{10}$.

Instead of providing separate braking means for the jack wheels or for the driving shaft thereof, braking may be obtained by means of the usual brakes on the rear wheels which, as above explained, are coupled (when the pinions $m$ and $n^3$ are engaged) with the jack wheel driving mechanism through the differential.

For heavy vehicles, more than four jacks may be provided.

It will be appreciated that the jack wheels may be left plain or provided with solid or pneumatic tyres as desired and, in some cases, the driving means for the jack wheels may be omitted, the car in this case being moved by hand.

I claim:—

1. In a motor car, a plurality of jacks mounted on the near-side of the motor car, a plurality of jacks mounted on the off-side of the motor car, means for operating both the near-side and off-side jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels and means for turning the off-side jack wheels in a horizontal plane to steer the motor car when raised on the jack wheels.

2. In a motor car, a plurality of jacks mounted on the near-side of the motor car, a plurality of jacks mounted on the off-side of the motor car, means for operating both the near-side and off-side jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels, and means coupling the off-side jack wheels with the steering member of the motor car so that operation of said steering member causes the off-side jack wheels to be swung in a horizontal plane to steer the motor car when raised on the jack wheels.

3. In a motor car, a plurality of jacks mounted on the near-side of the motor car, a plurality of jacks mounted on the off-side of the motor car, means for operating both the near-side and off-side jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels, arms outstanding from each of the off-side jack wheels, a link connecting said arms to cause the off-side jack wheels to move together, and means coupling the off-side jack wheels to the steering member of the motor car so that operation of said steering member causes the off-side jack wheels to be swung in a horizontal plane to steer the motor car when raised on the jack wheels.

4. In a motor car, a plurality of jacks, means for operating said jacks to raise the motor car so that its running wheels are clear of the ground, means for automatically disconnecting said jack operating means when the motor car has been raised sufficiently to clear its running wheels from the ground, wheels arranged transversely to the length of the motor car at the lower ends of the said jacks, means for driving certain of said jack wheels from the engine of the motor car whereby the motor car can be moved on said wheels and means for steering the vehicle when raised on the jack wheels.

5. In a motor car, a plurality of jacks mounted on the near-side of the motor car, a plurality of jacks mounted on the off-side of the motor car, means for operating both the near-side and off-side jacks to raise the motor car so that its running wheels are clear of the ground, means for automatically disconnecting said jack operating means when the motor car has been raised sufficiently to clear its running wheels from the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels and means for turning the off-side jack wheels in a horizontal plane to steer the motor car when raised on the jack wheels.

6. In a motor car, a plurality of jacks mounted on the near-side of the motor car, a plurality of jacks mounted on the off-side of the motor car, means for operating both the near-side and off-side jacks to raise the motor car so that its running wheels are clear of the ground, means for automatically disconnecting said jack operating means when the motor car has been raised sufficienty to clear its running wheels from the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels, arms outstanding from each of the off-side jack wheels, a link connecting said arms to cause the off-side jack wheels to move together, and means coupling the off-side jack wheels to the steering member of the motor car so that operation of said steering member causes the off-side jack wheels to be swung in a horizontal plane to steer the motor car when raised on the jack wheels.

7. In a motor car, a plurality of jacks mounted on the near-side of the motor car, a plurality of jacks mounted on the off-side of the motor car, means for operating both the near-side and off-side jacks to raise the motor car so that its running wheels are clear of the ground, a wheel arranged transversely to the length of the motor car at the lower end of each of the near-side and off-side jacks, means for driving the near-side jack wheels from the engine of the motor car, means for disconnecting said drive to the near-side jack wheels until such time as the motor car has been raised sufficiently to clear its running wheels from the ground whereby after the motor car has been raised it can be moved sideways on the jack wheels and means for turning the off-side jack wheels in a horizontal plane to steer the motor car when raised on the jack wheels.

8. In a motor car, a plurality of jacks mounted on the near-side of the motor car, a plurality of jacks mounted on the off-side of the motor car, means for operating both the near-side and off-side jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels, means for disconnecting said drive to the near-side jack wheels until such time as the motor car has been raised sufficiently to clear its running wheels from the ground, arms outstanding from each of the off-side jack wheels, a link connecting said arms to cause the off-side jack wheels to move together, and means coupling the off-side jack wheels to the steering member of the motor car so that operation of said steering member causes the off-side jack wheels to be swung in a horizontal plane to steer the motor car when raised on the jack wheels.

9. In a motor car, a plurality of jacks, means for operating said jacks to raise the motor car so that its running wheels are clear of the ground, means for automatically disconnecting said jack operating means when the motor car has been raised sufficiently to clear its running wheels from the ground, wheels arranged transversely to the length of the motor car at the lower ends of the said jacks, means for driving the near-side jack wheels from the engine of the motor car, means for disconnecting said drive to the near-side jack wheels until such time as the motor car has been raised sufficiently to clear its running wheels from the ground whereby after the motor car has been raised it can be moved sideways on the jack wheels and means for turning the off-side jack wheels in a horizontal plane to steer the motor car when raised on the jack wheels.

10. In a motor car, a plurality of hydraulic jacks mounted on the near-side of the motor car, a plurality of jacks mounted on the off-side of the motor car, a pump, an electric motor to operate said pump to pump fluid to said hydraulic jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels and means for turning the off-side jack wheels in a horizontal plane to steer the motor car when raised on the jack wheels.

11. In a motor car, a plurality of hydraulic jacks mounted on the near-side of the motor car, a plurality of jacks mounted on the off-side of the motor car, a pump, an electric motor to operate said pump to pump fluid to said hydraulic jacks to raise the motor car so that its running wheels are clear of the ground, a wheel arranged transversely to the length of the motor car at the lower end of each of the near-side and off-side jacks, means for driving the near-side jack wheels from the engine of the motor car, the off-side jack wheels being left free, whereby the motor car can be moved sideways on the jack wheels, arms outstanding from each of the off-side jack wheels, a link connecting said arms to cause the off-side jack wheels to move together, and means coupling the off-side jack wheels to the steering member of the motor car so that operation of said steering member causes the off-side jack wheels to be swung in a horizontal plane to steer the motor car when raised on the jack wheels.

12. In a motor car, the combination of a plurality of hydraulic jacks each comprising a cylinder and a piston, forks at the lower ends of said jack pistons, a spindle in each of said forks, wheels on said spindles and gear wheels on said wheels, and vertical shafts attached to the jack pistons, splines on said vertical shafts, a pinion splined on each of said vertical shafts and means for driving said pinions from the engine of the motor car, means for operating said hydraulic jacks to raise the motor car so that its running wheels are clear of the ground, whereby the motor car can be moved on said jack wheels.

13. In a motor car, a plurality of jacks mounted on the near side of the motor car, a plurality of jacks mounted on the off side of the motor car, means for operating said jacks, a fork at the lower end of each jack, a wheel journalled in each of said forks, gear wheels in driving connection with the wheels carried in the forks of one set of jacks, a vertical shaft to each of said set of jacks, a gear wheel on each of said vertical shafts engaging with the gear wheel in driving connection with the wheel in the fork, splines on each of said vertical shafts, a pinion on the splined part of each of said shafts, means for driving said pinions whereby the motor car can be moved under its own power when raised on jack wheels and means for swinging the other set of jack wheels in a horizontal plane to steer the motor car when raised on the jack wheels.

14. In a motor car, a plurality of jacks mounted on the near side of the motor car, a plurality of jacks mounted on the off side of the motor car, means for operating said jacks, a fork at the lower end of each jack, a wheel journalled in each of said forks, gear wheels in driving connection with the wheels carried in the forks of one set of jacks, a vertical shaft to each of said set of jacks, a gear wheel on each of said vertical shafts engaging with the gear wheel in driving connection with the wheel in the fork, splines on each of said vertical shafts, a pinion on the splined part of each of said shafts, means for driving said pinions whereby the motor car can be moved under its own power when raised on jack wheels, arms outstanding from the forks of the other set of jack wheels, a link connecting said arms to cause the said jack wheels to move together and means coupling the said jack wheels to the steering member of the motor car so that operation of said steering member of the motor car causes said further set of jack wheels to be swung in a horizontal plane to steer the motor car when raised on the jack wheels.

15. In a motor car, a plurality of jacks mounted on the near side of the motor car, a plurality of jacks mounted on the off side of the motor car, means for operating said jacks, a fork at the lower end of each jack, a wheel journalled in each of said forks, gear wheels in driving connection with the wheels carried in the forks of one set of jacks, a vertical shaft to each of said set of jacks, a gear wheel on each of said vertical shafts engaging with the gear wheel in driving connection with the wheel in the fork, splines on each of said vertical shafts, a pinion on the splined part of each of said shafts, means for driving said pinions whereby the motor car can be moved under its own power when raised on jack wheels, means for automatically disconnecting said jack operating means when the motor car has been raised sufficiently to clear its running wheels from the ground, and means for swinging the other set of jack wheels in a horizontal plane to steer the motor car when raised on the jack wheels.

16. In a motor car, a plurality of jacks mounted on the near side of the motor car, a plurality of jacks mounted on the off side of the motor car, means for operating said jacks, a fork at the lower end of each jack, a wheel journalled in each of said forks, a gear wheel in driving connection with the wheel carried in each fork of one set of jacks, a vertical shaft to each of said set of jacks, a gear wheel on each of said vertical shafts engaging with the gear wheel in driving connection with the wheel in the fork, splines on each of said vertical shafts, a pinion on the splined part of each of said shafts, means for driving said pinions whereby the motor car can be moved under its own power when raised on jack wheels, means for disconnecting said drive to the pinions until such time as the motor car has been raised sufficiently to clear its running wheels from the ground, and means for swinging the other set of jack wheels in a horizontal plane to steer the motor car when raised on the jack wheels.

17. In a motor car, a plurality of jacks mounted on the near side of the motor car, a plurality of jacks mounted on the off side of the motor car, means for operating said jacks, a fork at the lower end of each jack, a wheel journalled in each of said forks, a gear wheel in driving connection with the wheel carried in each fork of one set of jacks, a vertical shaft to each of said set of jacks, a gear wheel on each of said vertical shafts engaging with the gear wheel in driving connection with the wheel in the fork, splines on each of said vertical shafts, a pinion on the splined part of each of said shafts, means for driving said pinions whereby the motor car can be moved under its own power when raised on jack wheels, means for automatically disconnecting said jack operating means when the motor car has been raised sufficiently to clear its running wheels from the ground, means for disconnecting said drive to the pinions until such time as the motor car has been raised sufficiently to clear its running wheels from the ground, arms outstanding from the forks of the other set of jack wheels, a link connecting said arms to cause the said jack wheels to move together and means coupling the said jack wheels to the steering member of the motor car so that operation of said steering members of the motor car causes said further set of jack wheels to be swung in a horizontal plane to steer the motor car when raised on the jack wheels.

STANLEY BERMAN.